United States Patent Office 2,974,562
Patented Mar. 14, 1961

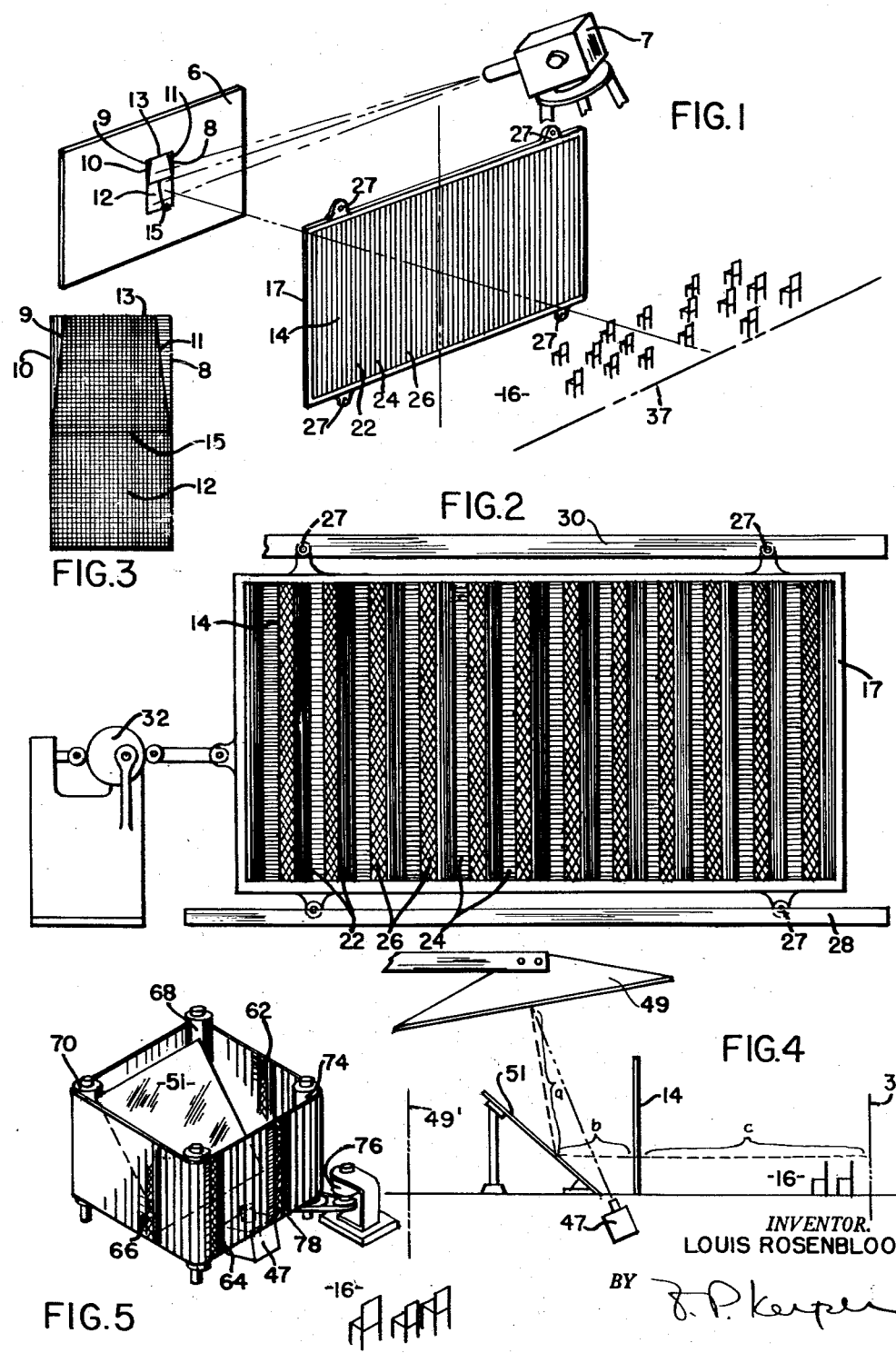

2,974,562
STEREOSCOPIC VISUALIZERS
Louis Rosenbloom, 71 Seneca St., Geneva, N.Y.
Filed July 9, 1954, Ser. No. 442,262
1 Claim. (Cl. 88—16.6)

This invention relates to steroscopic visualizers, and more particularly to a visualizer adapted to observation by a person or group of persons without requiring the use of any special apparatus by the observers.

Stereoscopic effect has been produced through use of polarized light, color filters, and the like. Such systems generally require the observer to employ devices similar to spectacles suitably fitted with polarized or colored eye pieces to effect the proper screening immediately adjacent the spectator's eyes, so that each eye will only see the correct image of a stereoscopic pair of images. Such devices render the stereoscopic display cumbersome and unnatural.

The present invention is directed to a stereoscopic visualizer system wherein individual spectators do not require screening devices, and in which a full stereoscopic effect is created. The invention further has to do with creating a stereoscopic effect in conjunction with relatively large views or images, and is adapted for use in presentation of still or motion pictures to groups. The invention is a further development of the invention disclosed in my application Serial No. 288,680, filed May 20, 1952, now Patent No. 2,684,013, July 20, 1954.

An object of the invention is the provision of a stereoscopic visualizer which may be observed by a plurality of spectators without use of any special individual spectator equipment.

Another object of the invention is the provision of a stereoscopic visualizer capable of utilizing large still or motion pictures, in which a control grid is employed for screening superimposed images forming a stereoscopic pair in a manner such as to create a single stereoscopic image.

A further object of the invention is the provision of a system providing three-dimensional effect, utilizing superimposed images comprising stereoscopic pairs with one image polarized at right angles to the other, wherein there is employed a grid comprising a plurality of recurring series of pairs of narrow transparent strip-like panels separated by opaque panels and in which one of the strip panels of each pair is polarized to pass light from one image, and the other polarized to pass light from the other image, the grid being adapted to be reciprocated in its own plane in a direction transverse to the strip-like panels.

The invention further has to do with the provision of a grid adapted to prevent both eyes of an observer from seeing the same parts of one image of a stereoscopic pair, while facilitating the simultaneous viewing of similar parts of both images, one eye being permitted to view one image only and the other eye being permitted to view only the other.

Still further, the invention is directed toward providing a screen composed of oppositely polarized transparent panels for the viewing of superimposed oppositely polarized images of a stereoscopic pair by direct sight, and in which there is introduced opaque panels disposed in relation to the oppositely polarized panels to block the sight of either eye from the incorrect image of the stereoscopic pair, whereby to prevent pseudo-stereoscopic effect.

The invention may, if desired, utilize superimposed pairs of stereoscopic images, in which each pair consists of one image of a different color than the other as red and blue for example, and wherein each of the transparent panels of each pair are colored to correspond, whereby one panel permits viewing of one image while screening out the other, and the other panel permits viewing of the other image only. Since such modification employs color for control, it is not adapted to images employing natural color effects.

The above and other novel features of the invention will appear more fully hereinafter from the following detailed description, when taken in conjunction with the accompanying drawings. It is expressly understood that the drawings are employed for purposes of illustration only and are not designed as a definition of the limits of the invention, reference being had for this purpose to the appended claim.

In the drawings, wherein like reference characters indicate like parts:

Figure 1 is a diagrammatic view in perspective of a stereoscopic visualizer system embodying the invention;

Figure 2 is a front elevational view of the grid employed in Figure 1;

Figure 3 is a front view of the superimposed stereoscopic pair of images shown in perspective on the screen of Figure 1;

Figure 4 is a diagrammatic showing of a variation of the system; and

Figure 5 is a vertical diagrammatic view of a flexible grid, adaptable to the system shown in Figure 4.

Referring to Figure 1 of the drawings, there is shown a screen 6, upon which a projector 7 is adapted to project superimposed stereoscopic images, which for illustrative purposes, may be the images 8 and 10 of the front and top of a cube, image 8 being formed by light polarized at right angles to the light-projecting image 10. The two superimposed images are shown in Figure 3. Image 8 consists of the area bounding the horizontal lines, and will be projected by utilizing horizontally polarized light; image 8 is to be viewed by the right eye.

Image 10 consists of the area bounding the vertical lines and will be projected by utilizing vertically polarized light. Image 10 is to be viewed by the left eye. The front face or square area of the cube indicated at 12 appears the same in both images. The top of the cube appears differently in the two images, since the left hand side edge of the top appears to the right eye to slope in the manner indicated by the line 9, whereas to the left eye, the right hand side edge of the top appears to slope as is indicated by the line 11. Thus the right image consists of the front face 12, and the top area as bounded by lines 8, 9, 13 and 15, whereas the left image consists of the front face and the top area bounded by lines 10, 11, 13 and 15. Each image constitutes the true planar appearance of the cube from two spaced points of view, the points being spaced by the interpupillary distance.

The screen is viewed from the area indicated at 16. Intermediate the viewing area and the screen is provided a grid 14. Such grid 14 is composed of a plurality of vertical strips mounted in a frame 17, the strips being arranged in repeating pairs of transparent panels, one polarized vertically and the other polarized horizontally, each pair being separated by an opaque panel. In Figure 2, such strips as are polarized vertically are indicated by the reference character 22, those polarized horizontally by the character 24, and those opaque by reference character 26. Each of the transparent strips is approximately 1¼" to 1½" wide, or approximately ½ of the normal interpupillary spacing, the standard for which is generally accepted as 2½–3".

The plane of the grid will be located midway between the screen and the outer boundary 37 of the viewing area.

The grid, in order to afford a view of the entire image on both screens, and to produce the desired stereoscopic three-dimension effect upon the observer, is mounted on rollers 27 to reciprocate on tracks 28 and 30, and suitable cam or crank or other mechanism is employed as at 32 to rapidly oscillate the screen. The amplitude of movement imparted to the screen should embrace at least the width of two panels or 2½"–3", and in practice, a to-and-fro motion of uniform velocity or as near thereto as possible is desirable as by a uniform rise and fall cam, in preference to the simple harmonic motion of a crank mechanism.

The image 8 to be observed by the right eye by direct vision through the panels 24 will be the right hand image of a stereoscopic pair. The image 10 to be observed by the left eye through the panels 22 will be the left hand image of the stereoscopic pair. The vertically polarized panel and the horizontally polarized panel to the right will act as a pair to thus simultaneously permit the left eye to view through the panel 22, and the right eye through the panel 24, stereoscopically the corresponding parts of the respective images 10 and 8.

Use is made of the principle of the isosceles triangle, with the eyes as the base and the lines of vision as the sides, the grid at least bisecting the lines of vision for the furthest observer in a given area, so that at no time will both lines of vision cross the same section of the grid simultaneously by any spectator in that area.

Assuming the perception or viewing area 16 to have an outer boundary 37, if the grid be located half way between the outer boundary 37 and the screen 6, then spectators within the area will be prevented from seeing with both eyes simultaneously, any common portion of, for example, image 8, by reason of the width of the panels 24 being ½ the interpupillary spacing. Likewise a spectator within such area will be prevented from seeing with both eyes simultaneously any common portion of image 10 through the panels 22, by reason of the width of such panels being ½ of the interpupillary spacing. The panels 24 permit the right eye to view the right hand image 8. At the same time, the adjacent panels 22 immediately to the left of the panels 24 permit the left eye to observe the corresponding parts of the other image 10 on screen 6.

The line of sight by the right pupil, upon any observable point on image 8 and the line of sight of the left pupil upon the corresponding point on image 10 will, so far as the observer is concerned, provide the natural convergence resulting from direct observation of a three-dimensional object. Image 8 and image 10 being a stereoscopic pair, will thus provide the usual effect of observing directly a three-dimensional object, since the respective images of a stereoscopic pair are constituted by the projected view of the object upon a plane, as taken from observation points spaced as by the interpupillary distance.

Thus, a vertically polarized panel and an adjacent horizontally polarized panel to the right thereof affords opportunity for the left eye and the right eye to simultaneously observe the corresponding parts of the image 10 and the image 8 respectively. In order to assure that the right eye will always be trained upon the image 8, and through the panels 24, and that the left eye will always be trained upon the panels 22 and the image 10, opaque panels are disposed to the right of the horizontally polarized panel and to the left of the vertically polarized panel of each polarized panel pair. By such arrangement, the vision of each eye on the respective correct image of the stereoscopic pair is assured.

For example, if the opaque panels were to be omitted, and the horizontally and vertically polarized panels arranged in an alternating series, without opaque panels, there would be nothing to prevent the right eye from diverting from sight through the horizontally polarized panels, to a line of sight ½ through the vertically polarized panel, causing the left eye to shift from line of sight through the vertically polarized panels to a line of sight through the horizontally polarized panels. Such an arrangement would create nothing but confusion and destroy any sense of stereoscopic effect, because the right eye would then be directed toward the left hand image of the stereoscopic pair and the left eye directed toward the right hand image.

When the grid is not in motion, alternating parts of the image are stereoscopic and other parts are flat. These flat parts are monocular, a function of the opaque strips and different for each eye, since the opaque strips cut off the view of one eye. When the grid is in motion, these flat monocular parts drop off and only the stereoscopic parts are retained. This "dropping off" of the flat parts is psychological and is perhaps explained by the predominant factor theory—that the observers are attuned to binocular vision and therefore retain the stereoscopic sections only when the flat monocular parts are displaced by stereoscopic parts. Motion pictures and television make use of a somewhat similar retentive principle.

In stereoscopic viewing devices, it is essential that some means be provided to mechanically enforce one eye to view the correct image of a stereoscopic pair, and that image only, and the other eye to view only the other image of the pair, and the mechanical means for accomplishing this result in the present invention is the provision of the opaque panels on either side of each pair of vertically and horizontally polarized panels, such opaque panels spacing each vertically and horizontally polarized panel pair.

It is preferable that the viewing area be so confined that all observation points are at no greater distance from any part of the grid 14 than the distance of the grid from the images, since the width of the polarized panels are only completely effective in preventing both eyes from seeing simultaneously a common point on the one image, when the observation point is no more than double the distance between the image and the grid controlling the view of the image.

While the polarized panel pairs have been described with one vertically polarized to the left, and the other horizontally polarized to the right, the reverse may be used, but in such case the polarization of the projected images of the stereoscopic pair must be reversed; that is, the right image must always be viewed through the panels 24 and the left image through panels 22. The polarization of the images on the screen may be effected at other angles than horizontal and vertical, such as at angles of 45° to the horizontal and in such case, the panels will be oppositely polarized at 45° to correspond.

If it be desired to increase the spectator viewing area, a modification of the system as shown in Figure 4 may be employed. In Figure 4, the grid 14 lies in a vertical plane with the viewing area 16, and the boundary 37 indicated as before. Behind the grid, and below is a projector 47 directed upward toward a screen 49. The stereoscopic pictures projected on the screen 49 are seen by the spectators, through the grid 14, by a plain reflecting mirror 51. With this arrangement, the screen, projector and mirror occupy less space than in the arrangement of Figure 1, while the viewing effect remains the same, the image appearing to observers to be as though the screen were in the same position as it is shown in Figure 1, as for example 49'. The combined distance from the screen, to the center of the mirror a, and from the center ot the mirror to the brid *b* is the same as the distance *c* from the grid 14 to the boundary 37. The projected images will of course be reversed so as to compensate for the mirror reflected view.

Instead of an oscillating grid as shown in Figures 1, 2, and 4, the grid may be a wide flexible belt as shown in Figure 5, the belt traversing on vertical rollers around the inclined mirror. More particularly, the belt 60, having vertical panels consisting of opaque panels 62 separating pairs of polarized panels, panels 64 of each pair being polarized oppositely from panels 66 of each pair. Such belt surrounds the inclined mirror 51 and runs on vertical rollers 68, 70, 72 and 74, one of which is driven by a motor 76. The rollers may be journalled in any desired manner. The planar portion 78 of the belt lies in the same plane as the screen 14 shown in Figure 4, and the relation of the mirror 51 and projector 47 remains the same. The strips of the grid are 1¼ to 1½" wide or ½ the interpupillary spacing as before.

If it be desired, the images 8 and 10 may be projected in colors such as red and blue, and in such case the panels 24 would be colored to permit passage of blue light only, while panels 22 would be colored to permit passage of red light only. However, where colors are used, it is not possible to view images in natural color.

The width of the opaque panels has been made equal to the width of either of the polarized panels. In practice the transverse panels may be of polarized plastic while the opaque panels are of opaque plastic.

Rapid oscillation of the grid or continuous movement of the belt at a speed so as to escape notice thereof will be desirable, and the rate of oscillation or movement should be such, in the case of motion pictures, that opportunity is afforded to view each entire frame.

While modified forms of the invention have been illustrated and described, it is to be understood that the invention is not limited thereto. As various changes in the construction and arrangement may be made without departing from the spirit of the invention, as will be apparent to those skilled in the art, reference will be had to the appended claim for a definition of the limits of the invention.

What is claimed is:

A stereoscopic visualizer system comprising a non depolarizing screen, means for directly and substantially simultaneously projecting a pair of images upon said screen comprising a superimposed stereoscopic pair, said means projecting one image by light polarized at right angles to the other image; a viewing area located forward of said screen having an outer boundary spaced from said screen a substantial distance and extending generally parallel with said screen, a grid located in a plane midway between said outer boundary and said screen and arranged transversely between said area and said screen and defining an inner boundary for said viewing area, said grid being composed of repeating series of three narrow parallel panels all lying in the plane of the grid, each of a width of 1¼ to 1½ inches and of the same height as the grid, each of said series of panels consisting from left to right of an opaque, a transparent light polarizing panel oriented to transmit light only from the left hand image of said pair, and a transparent light polarizing panel at right angles to the other transparent panel to transmit light only from the right hand image of the pair, and means for rapidly oscillating said grid crosswise of said panels through a distance at least the width of two panels.

References Cited in the file of this patent

UNITED STATES PATENTS

| | | |
|---|---|---|
| 2,218,875 | Parsell | Oct. 22, 1940 |
| 2,307,276 | Keyzer | Jan. 5, 1943 |
| 2,309,879 | Willis | Feb. 2, 1943 |
| 2,336,938 | Keijzer | Dec. 14, 1943 |
| 2,401,271 | Pi Suner | May 28, 1946 |
| 2,623,433 | Stipek | Dec. 30, 1952 |

FOREIGN PATENTS

| | | |
|---|---|---|
| 73,528 | Netherlands | Nov. 16, 1953 |
| 1,006,458 | France | Jan. 23, 1952 |